(12) United States Patent
Begeja et al.

(10) Patent No.: US 10,114,893 B2
(45) Date of Patent: Oct. 30, 2018

(54) METHOD AND SYSTEM FOR INFORMATION QUERYING

(71) Applicant: AT&T Intellectual Property I, LP, Atlanta, GA (US)

(72) Inventors: Lee Begeja, Gillette, NJ (US); Zhu Liu, Marlboro, NJ (US); Bernard S. Renger, New Providence, NJ (US); Behzad Shahraray, Holmdel, NJ (US); David Crawford Gibbon, Lincroft, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 390 days.

(21) Appl. No.: 14/530,124

(22) Filed: Oct. 31, 2014

(65) Prior Publication Data
US 2015/0052119 A1    Feb. 19, 2015

Related U.S. Application Data

(62) Division of application No. 11/851,254, filed on Sep. 6, 2007, now Pat. No. 8,904,442.

(51) Int. Cl.
| | |
|---|---|
| *G06F 7/00* | (2006.01) |
| *G06F 17/30* | (2006.01) |
| *G06K 9/00* | (2006.01) |
| *G10L 15/22* | (2006.01) |

(52) U.S. Cl.
CPC .. *G06F 17/30799* (2013.01); *G06F 17/30554* (2013.01); *G06F 17/30796* (2013.01); *G06K 9/00302* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 5,481,296 A | 1/1996 | Cragun | |
| 5,559,949 A * | 9/1996 | Reimer | G06F 17/30017 348/E7.071 |
| 5,703,655 A * | 12/1997 | Corey | G11B 27/105 348/468 |
| 6,061,056 A * | 5/2000 | Menard | H04N 5/4401 348/E5.108 |
| 6,185,573 B1 * | 2/2001 | Angelucci | G06F 17/30017 705/1.1 |
| 6,243,684 B1 * | 6/2001 | Stuart | G10L 15/26 704/246 |
| 6,463,343 B1 | 10/2002 | Emens et al. | |
| 6,631,523 B1 | 10/2003 | Matthews, III et al. | |

(Continued)

*Primary Examiner* — Jonathan V Lewis
(74) *Attorney, Agent, or Firm* — Guntin & Gust, PLC; Joseph Hrutka

(57) ABSTRACT

Methods and systems for information querying are described. At least one recent image of a video signal may be accessed. Recent text associated with the at least one recent image may be accessed. A presentation image may be provided from the at least one recent image for presentation on a display. An original portion of the recent text may be identified within the presentation image. A selection of a user portion of the recent text may be received. An information source may be queried with the selection of the user portion of the recent text. The information source may be capable of using the selection to provide a result.

18 Claims, 21 Drawing Sheets

(56) References Cited

U.S. PATENT DOCUMENTS

| | | | |
|---|---|---|---|
| 6,961,954 B1 * | 11/2005 | Maybury | G06F 17/30787 |
| | | | 707/999.003 |
| 7,246,314 B2 | 7/2007 | Foote et al. | |
| 7,346,184 B1 * | 3/2008 | Carr | G06K 9/2063 |
| | | | 382/100 |
| 7,356,830 B1 * | 4/2008 | Dimitrova | G06F 17/30787 |
| | | | 375/E7.001 |
| 7,379,627 B2 * | 5/2008 | Li | G06K 9/4652 |
| | | | 382/305 |
| 7,415,718 B1 | 8/2008 | Wang et al. | |
| 7,861,275 B1 | 12/2010 | Vellaikal et al. | |
| 8,073,808 B2 * | 12/2011 | Rose | B82Y 10/00 |
| | | | 706/62 |
| 8,185,543 B1 * | 5/2012 | Choudhry | G06F 17/30781 |
| | | | 382/305 |
| 8,296,797 B2 * | 10/2012 | Olstad | G06F 17/30796 |
| | | | 725/37 |
| 8,296,808 B2 * | 10/2012 | Hardacker | H04N 7/163 |
| | | | 725/131 |
| 8,528,022 B1 | 9/2013 | Schwartz et al. | |
| 9,373,076 B1 * | 6/2016 | Appelman | G06Q 10/10 |
| 2001/0003184 A1 * | 6/2001 | Ching | G06F 3/0237 |
| 2001/0003214 A1 | 6/2001 | Shastri | |
| 2001/0049826 A1 * | 12/2001 | Wilf | H04N 5/50 |
| | | | 725/120 |
| 2002/0147984 A1 | 10/2002 | Tomsen | |
| 2002/0162112 A1 | 10/2002 | Javed | |
| 2003/0005461 A1 * | 1/2003 | Shinohara | H04N 7/0885 |
| | | | 725/110 |
| 2003/0237092 A1 | 12/2003 | Suzuki | |
| 2004/0025180 A1 | 2/2004 | Begeja et al. | |
| 2004/0237097 A1 | 11/2004 | Covell et al. | |
| 2005/0071746 A1 * | 3/2005 | Hart | G06F 3/1206 |
| | | | 715/200 |
| 2006/0020962 A1 | 1/2006 | Stark et al. | |
| 2006/0050183 A1 | 3/2006 | Ohno et al. | |
| 2006/0056803 A1 * | 3/2006 | Seo | G11B 27/105 |
| | | | 386/314 |
| 2006/0122976 A1 * | 6/2006 | Baluja | G06F 17/30864 |
| 2006/0157559 A1 * | 7/2006 | Levy | G06K 17/00 |
| | | | 235/380 |
| 2006/0167859 A1 * | 7/2006 | Verbeck Sibley | |
| | | | G06F 17/30637 |
| 2006/0251338 A1 * | 11/2006 | Gokturk | G06F 17/30253 |
| | | | 382/305 |
| 2006/0271522 A1 * | 11/2006 | Scott, III | G06F 17/30637 |
| 2007/0118873 A1 * | 5/2007 | Houh | G06F 17/30746 |
| | | | 725/136 |
| 2007/0250476 A1 * | 10/2007 | Krasnik | G06F 17/30327 |
| 2008/0077954 A1 | 3/2008 | Cohen | |
| 2008/0086688 A1 * | 4/2008 | Chandratillake | |
| | | | G06F 17/30817 |
| | | | 715/719 |
| 2008/0154870 A1 * | 6/2008 | Evermann | G06F 17/30867 |
| 2008/0155627 A1 * | 6/2008 | O'Connor | H04N 7/173 |
| | | | 725/109 |
| 2008/0256590 A1 * | 10/2008 | Oosterholt | H04L 12/282 |
| | | | 725/135 |
| 2009/0178081 A1 | 7/2009 | Goldenberg et al. | |
| 2009/0199235 A1 | 8/2009 | Surendran et al. | |
| 2010/0005084 A1 | 1/2010 | Nguyen et al. | |
| 2012/0089996 A1 | 4/2012 | Ramer et al. | |

* cited by examiner

METHOD AND SYSTEM FOR INFORMATION QUERYING

CROSS-REFERENCE TO RELATED APPLICATIONS

This application is a Divisional of and claims priority to U.S. patent application Ser. No. 11/851,254, filed Sep. 6, 2007. The contents of which are hereby incorporated by reference into this application as if set forth herein in full.

FIELD OF THE DISCLOSURE

This application relates to a method and system for content processing, and more specifically to methods and systems for information querying.

BACKGROUND OF THE DISCLOSURE

A user of a television or other display device seeking content may be limited to receiving a video signal from a television broadcast station or other video signal source. The user may select different content by use of a remote control. The content once received may be presented on the display device.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF THE DRAWINGS

Example methods and systems for information querying are described. In the following description, for purposes of explanation, numerous specific details are set forth in order to provide a thorough understanding of example embodiments. It will be evident, however, to one skilled in the art that the present invention may be practiced without these specific details.

In an example embodiment, at least one recent image of a video signal may be accessed. Recent text associated with the at least one recent image may be accessed. A presentation image may be provided from the at least one recent image for presentation on a display. An original portion of the recent text may be identified within the presentation image. A selection of a user portion of the recent text may be received. An information source may be queried with the selection of the user portion of the recent text. The information source may be capable of using the selection to provide a result.

In an example embodiment, a query command may be received. At least one media image of a media presentation may be accessed in accordance with the receiving of the query command. Recent text associated with the media presentation may be accessed. An information source may be queried with a portion of the recent text, the information source capable of using the portion to provide a result.

In an example embodiment, a plurality of candidate terms associated with a media presentation may be accessed. A predictive text entry may be received for the media presentation. At least one identified term associated with the media presentation may be identified based on the plurality of candidate terms and the predictive text entry. An information source may be queried with the at least one identified term.

Figure 1:
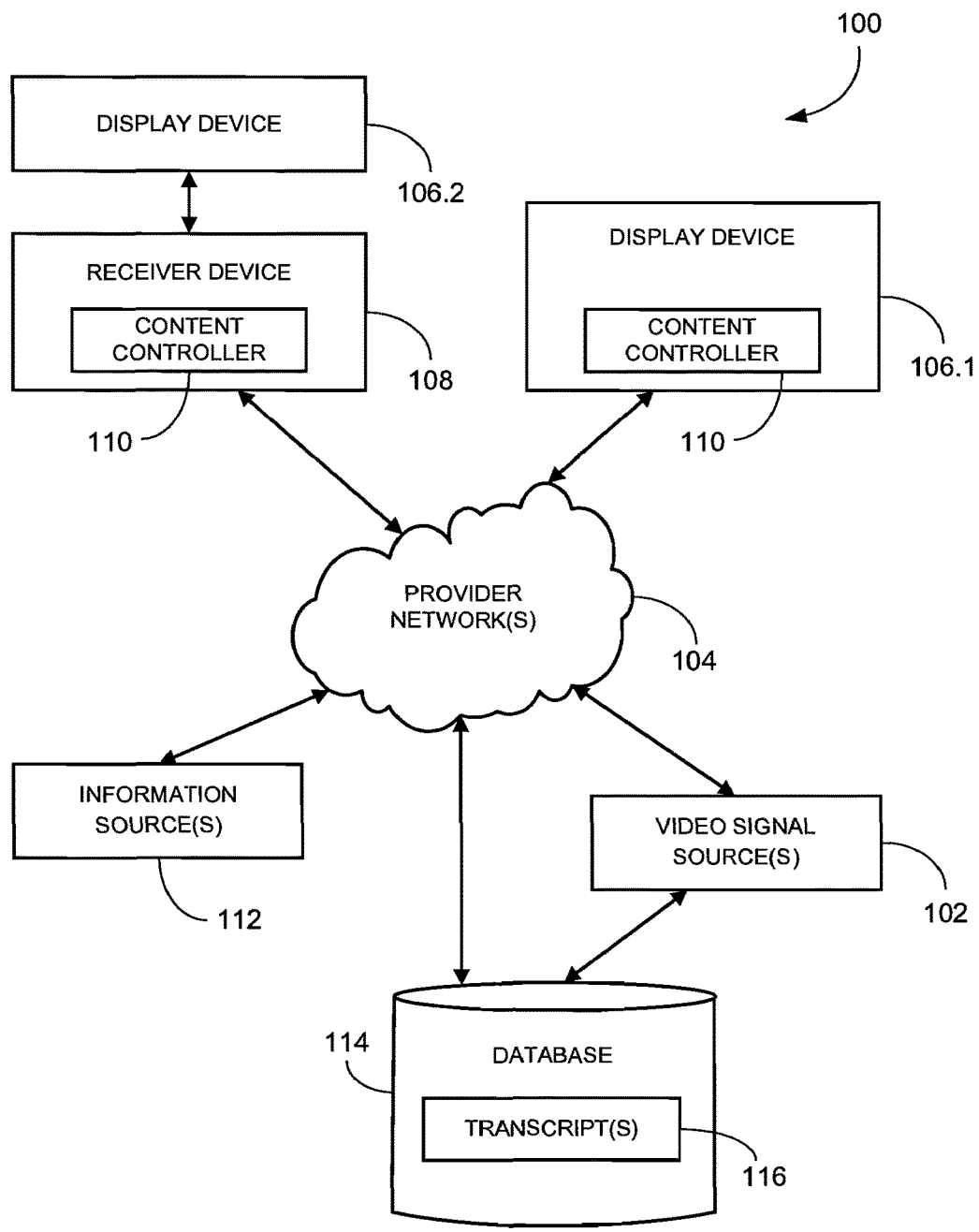
FIG. 1 is a block diagram of an example content system according to an example embodiment.

FIG. 1 illustrates an example content system 100. A video signal source 102 may provide content in the form of a video signal over a provider network 104 to a receiver device 108 and/or a display device 106.1 for presentation. The receiver device 108 and/or the display device 106.1 may include a content controller 110 to receive the video signal from the video signal source 102, access text associated with images of the received video signal, and query an information source 112 with the text. An example embodiment of the content controller 110 is described in greater detail below.

The video signal may be a sequence of images and one or more associated audio tracks. The video signal may be a high quality video stream (e.g., MPEG-4) that is transcoded for distribution to the display device 106.1 and/or the receiver device 108. The video signal may include standard definition (SD) or high definition (HD) video signals in NTSC (National Television System Committee), PAL (Phase Alternation Line), SECAM (Systeme Electronique Couleur Avec Memoire), sequence of bitmaps or other signal formats that transport a sequence of images. The form of the video signal may be modified to enable implementations of various formats and resolutions. The video signal may provide a variety of content types including, without limitation, television programs, music, movies, and commercials.

The provider network 104 may be a television distribution network, Global System for Mobile Communications (GSM) network, an Internet Protocol (IP) network, a Wireless Application Protocol (WAP) network, and/or a WiFi network. Other networks may also be used.

The video signal source 102 may be a television station, a broadcast network, a server, or the like. A transcript 116 of the video signal may be provided over the provider network 104 by the video signal source 102 or a different party from a database 114.

The display device 106.1, 106.2, may be a television monitor, a mobile telephone, a portable gaming device, a personal digital assistant (PDA), a computer monitor, and the like. Other types of display devices may also be used.

A content controller 110 may be embodied within the display device 106.1 and/or the receiver device 108 to enable presentation of a video signal and/or a result from the information source 112. Examples of the receiver device 108 include a set-top box (STB), a receiver card, a mobile telephone, a PDA, and a computing system; however other devices may also be used. A remote control may control the display device 106.1, 106.2, and/or the receiver device 108.

The information source 112 may be an Internet search engine/web index (e.g., GOOGLE or YAHOO!) or other Internet provider of using a text or other data (e.g., facial recognition data and speech recognition data) to provide a result. The information source 112 may include a video archive with video on demand (VOD) content, available video clips from a number of sites, one or more maps, and/or information from encyclopaedic sources. The content may be pre-recorded or provided in real-time. Different types of video and/or non-video content may also be provided from the information source 112.

In an example embodiment, the information source 112 may be a predetermined piece of information associated to a keyword that appears in the recent text. The predetermined piece of information may provide additional information, an advertisement, or the like.

Figure 2:
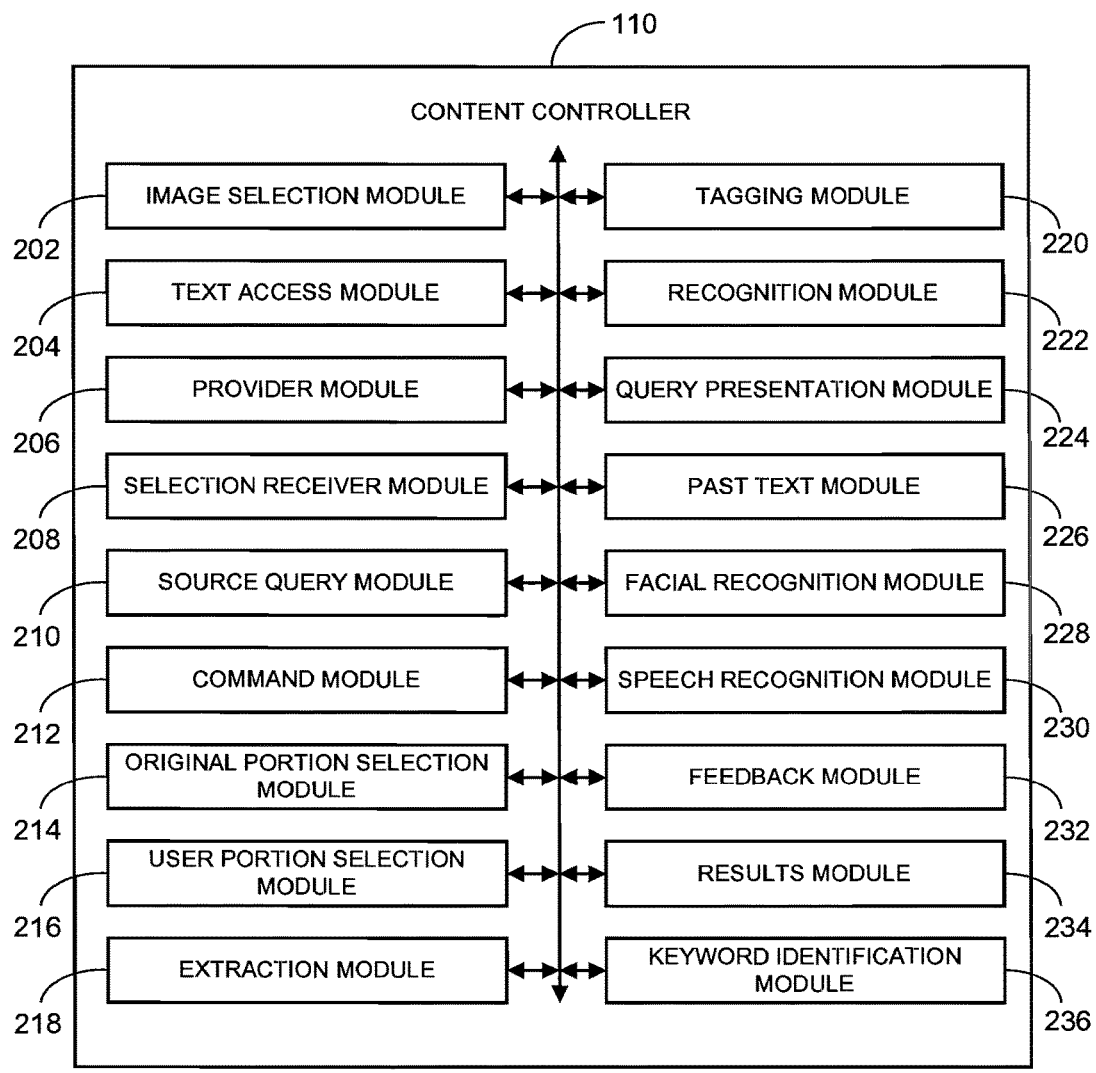
FIG. 2 is a block diagram of an example content controller that may be deployed in the content system of FIG. 1 according to an example embodiment.

FIG. 2 illustrates an example content controller 110 that may be deployed in the content system 100 (see FIG. 1) and/or another system.

The content controller 110 may include an image selection module 202, a text access module 204, a provider module 206, selection receiver module 208, a source query module 210, a command module 212, an original portion selection module 214, a user portion selection module 216, an extraction module 218, a recognition module 222, a query presentation module 224, a past text module 226, a facial recognition module 228, a speech recognition module 230, a feedback module 232, a results module 234, and/or a keyword identification module 236. Other modules may also be used.

The image selection module 202 accesses at least one recent image of a video signal and/or selects the at least one recent image and/or at least one different image of the video signal in accordance with a command.

The text access module 204 accesses recent text associated with the one or more recent images and/or accesses different text associated with the one or more different images. The recent text may include text in proximity of a current play point of the video signal. For example, the recent text may include all text since the start of the video program or additional text that corresponds to program content that occurs subsequently to a point at which the user has paused the video program (e.g., as would be available during replay of recorded content from a DVR). In an example embodiment, the term recent may refer to content in temporal proximity to the current replay point of the media program (e.g., prior to or after the current replay point).

The recent text may be accessed from closed captioning from the video signal, the result of performing optical character recognition (OCR) on the one or more recent images of the video signal, the result of performing speech recognition on the audio portion of the video signal, and/or a transcript associated with the video signal. The recent text may also be accessed in other ways.

The provider module 206 provides a presentation image from the one or more recent images, the one or more different images and/or the recent text for presentation on a display. An original portion of the recent text may be identified within the presentation image.

The selection receiver module 208 receives a selection of a user portion of the recent text. The source query module 210 queries an information source with a selection of a user portion of the recent text, a portion of the recent text, facial recognition data, and/or speech recognition data.

The command module 212 receives a stop command, an image selection command, a history command, a query command, a video adjustment command and/or a text adjustment command for the recent text. The command may be received from a remote control or otherwise received.

The original portion selection module 214 selects the original portion of the recent text for identification within the presentation image. The user portion selection module 216 selects the user portion of the recent text in accordance with the text adjustment command, a named entity extraction, and/or tagging of one or more parts of speech of the recent text, recognition of one or more phrases in the recent text.

The extraction module 218 applies named entity extraction to the recent text. The tagging module 220 tags the one or more parts of speech of the recent text. The recognition module 222 recognizes one or more phrases in the recent text. The query presentation module 224 provides a past query for presentation.

The past text module 226 provides a past text selection for presentation. The facial recognition module 228 performs facial recognition on the one or more recent images to receive facial recognition data. The speech recognition module 230 performs speech recognition on a portion of the video signal related to the one or more recent images to receive speech recognition data.

The feedback module 232 provides feedback regarding the querying of the information source. The results module 234 receives the result from the information source in response to the query and/or provides the result for presentation on the display. The keyword identification module 236 identifies one or more keywords from the recent text as the portion of the recent text.

Figure 3:
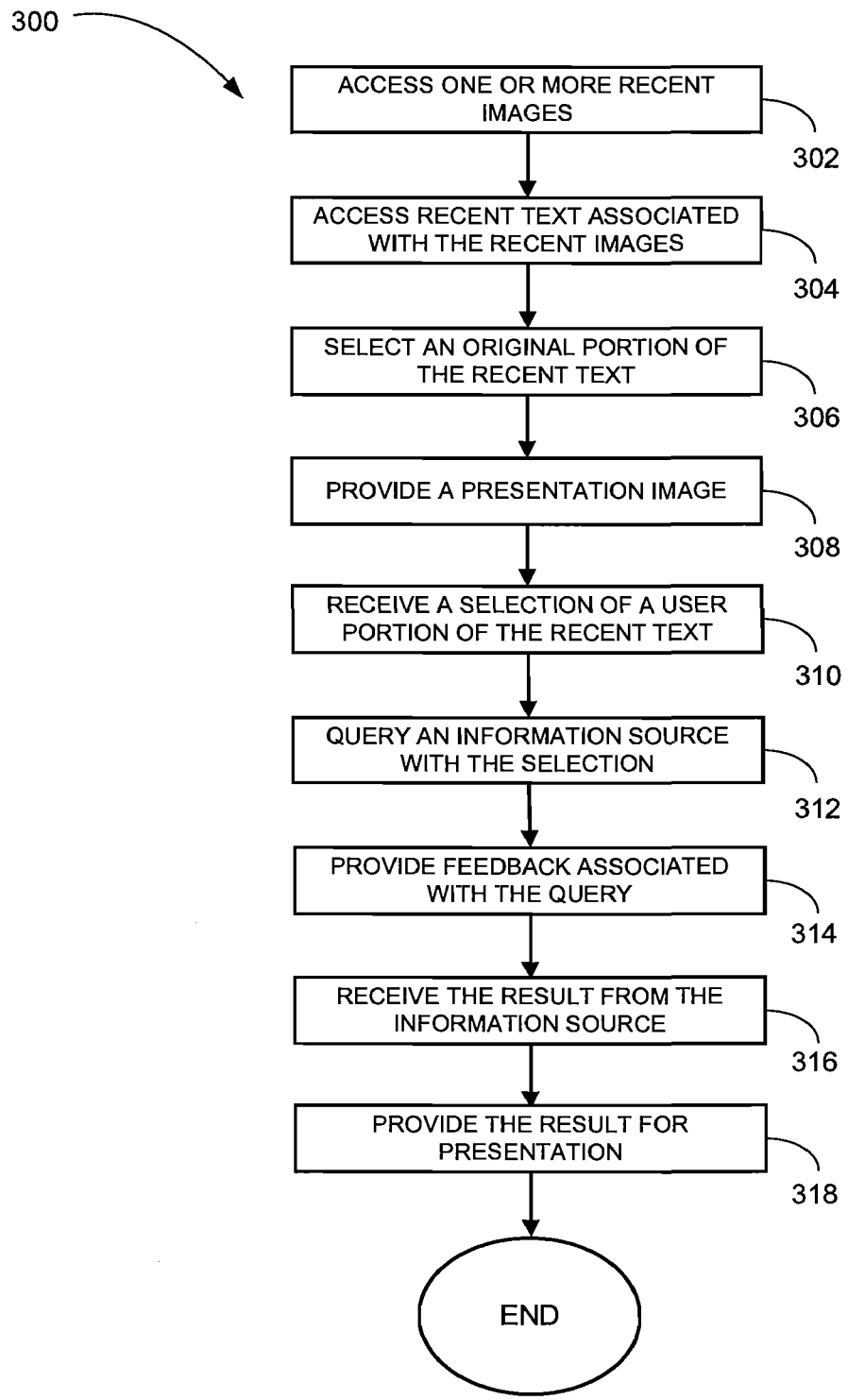
FIG. 3 is a flowchart illustrating a method for information querying in accordance with an example embodiment.

FIG. 3 illustrates a method 300 for information querying according to an example embodiment. The method 300 may be performed by the content controller 110 (see FIG. 1) of the content system 100 or otherwise performed.

One or more recent images of a video signal are accessed at block 302. The recent images may be a single recent image, multiple recent images, or a recent video clip including multiple images. In an example embodiment, a stop command may be received (e.g., from a remote control) and one or more recent images of the video signal may be selected in accordance with the stop command. The stop command may pause the presentation of the video signal on a display.

Recent text associated with one or more recent images is accessed at block 304. The recent text may be accessed from closed captioning or teletext of the video signal (e.g., closed captioning text) and/or a transcript or pre-production script associated with the one or more recent images of the video signal (e.g., transcript text). The recent text may be accessed by performing optical character recognition (e.g., optical character recognition text) on the one or more recent images of the video signal and/or by performing speech recognition on the audio portion of the video signal (e.g., speech recognition text). The recent text may be received from the one or more recent images and/or additional images (e.g., the closed captioning of a video clip). The recent text may also be received in other ways.

An original portion of the recent text may be selected for identification within the presentation image at block 306. By way of an example, the recent text may be a section of a speech being made by the President of the United States, while the original portion may be one or more terms selected by default from the recent speech.

A presentation image is provided from the one or more recent images for presentation on a display at block 308. An original portion of the recent text may be identified within the presentation image. The original portion may be identified based on a current position of the video signal, predictive text entry, social networking (e.g., a history of selections by other users) or otherwise identified. The original portion may be identified through highlighting, a change of color, a box, or otherwise identified. In an example embodiment, the recent text may be provided for simultaneous presentation with the presentation image.

In an example embodiment, the recent text may be designated for presentation in a first portion of the display and the presentation image may be designated for presentation in a second portion of the display.

A selection of a user portion of the recent text is received at block 310. The selection may be received from a user by a remote control or otherwise received. The selection may be made by predictive text entry and/or a manual selection of the user portion. The process of selecting the user portion may include moving an identifier among one or more terms of the recent text and/or changing position in the video signal. For example, the position in the video signal may be changed when the video signal is pre-recorded and/or being cached (e.g., in a DVR). The user portion may be otherwise selected.

By way of an example, a user may choose between available terms through use of arrow keys on the interface. The user may make a double click, a key sequence, or make a different type of action to select between single terms, short phrases, longer phrases, and/or sentences of the recent text.

The information source 112 is queried with the selection of the user portion of the recent text at block 312. The information source may be capable of using the selection to provide a result. The user portion of the recent text may be classified to enable queries to be handled in differing ways (e.g., a particular information source 112 for a particular type of classification).

Feedback regarding the querying of the information source may be provided at block 314. The feedback may include, by way of example, the portion of the recent text, the recent text, a querying indication that the querying of the information is being performed, and/or a results indication that the result of the information source has been provided. Other type of feedback may also be provided.

The result may be received from the information source in response to the query at block 316. The result may be provided for presentation on the display at block 318. The result may include, by way of example, text data, image data, audio data, and/or video data. The result may be provided to the display device 106.1, the receiver device 108, or otherwise provided. The receiver of the result need not be the device from which the query was made. For example, the result may made from the received device 108 in an IPTV system and be provided to a mobile telephone.

In an example embodiment, the selection of the user portion of the recent text may enable the user to specify one or more terms to be used for query of the information source 112 without typing the terms using a remote control or other interface. The user portion of the recent text may enable the user to use a limited interface (e.g., as provided using a remote control) to specify the one or more terms for the query.

Figure 4:
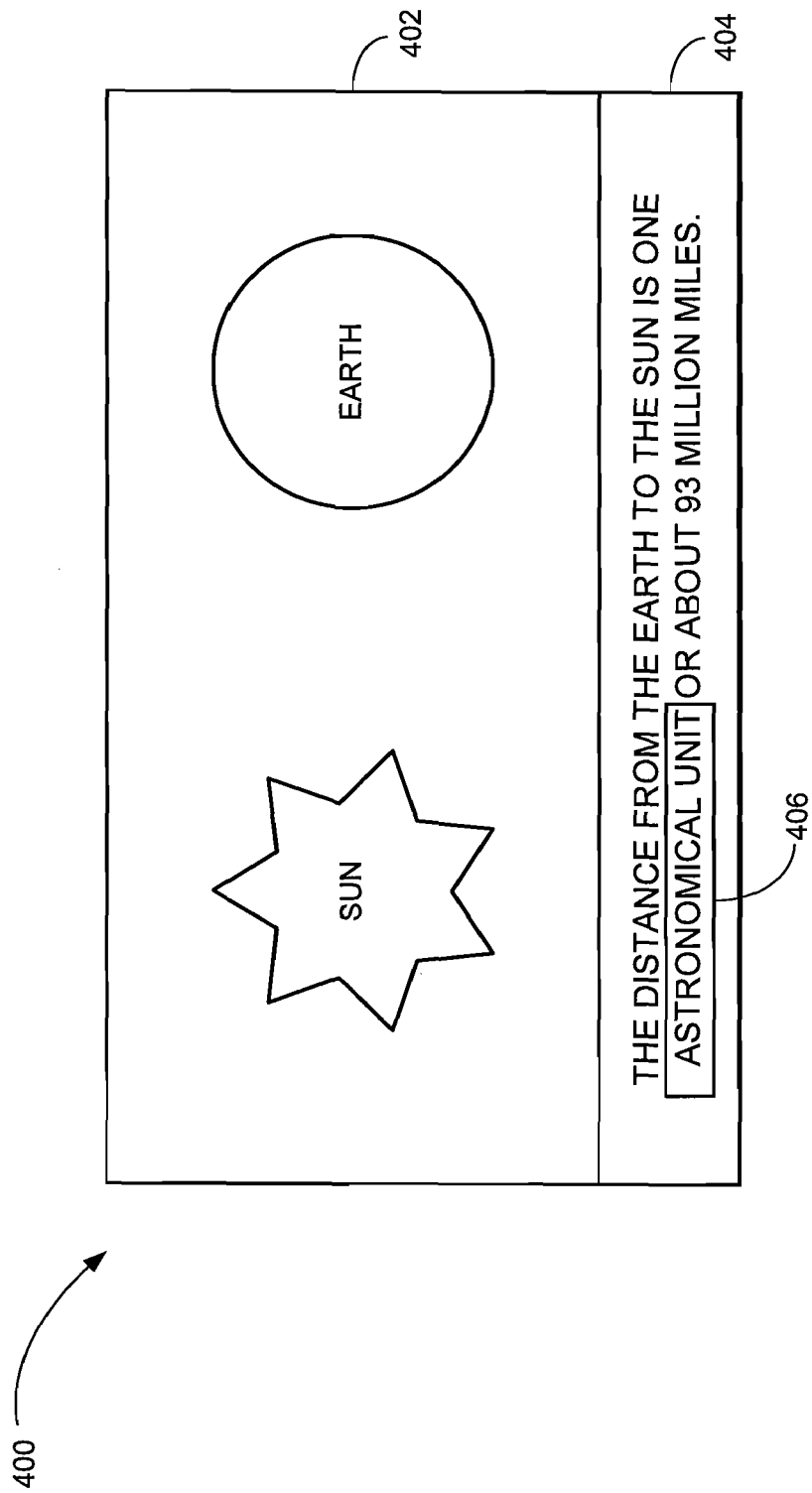
FIGS. 4-7 are block diagrams of example user interfaces of a display according to an example embodiment.

FIG. 4 illustrates an example of a user interface 400 that may be provided on the display device 106.1, 106.2 (see FIG. 1) when deployed in the content system 100. Other devices in the content system 100 or different systems may also be used.

The user interface 400 may include presentation of content 402 and associated recent text 404. The recent text 404 may include a selection 406 of a user portion of the recent text 404.

Figure 5:
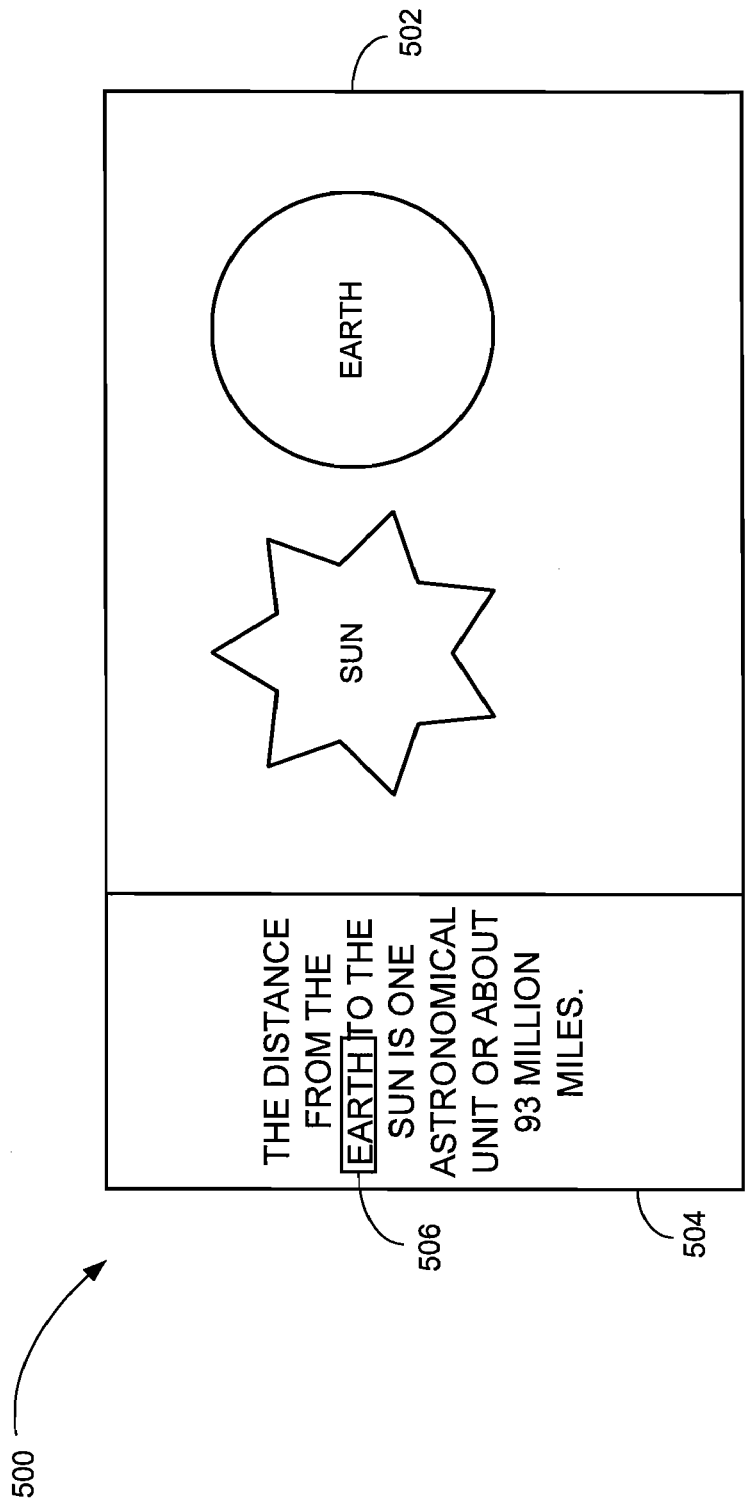

FIG. 5 illustrates an example of a user interface 500 that may be provided on a display of the display device 106.1, 106.2 (see FIG. 1) when deployed in the content system 100. Other devices in the content system 100 or different systems may also be used.

The user interface 500 may include presentation of content 502 and associated recent text 504. The recent text 504 may include a selection 506 of a user portion of the recent text 504.

Figure 6:
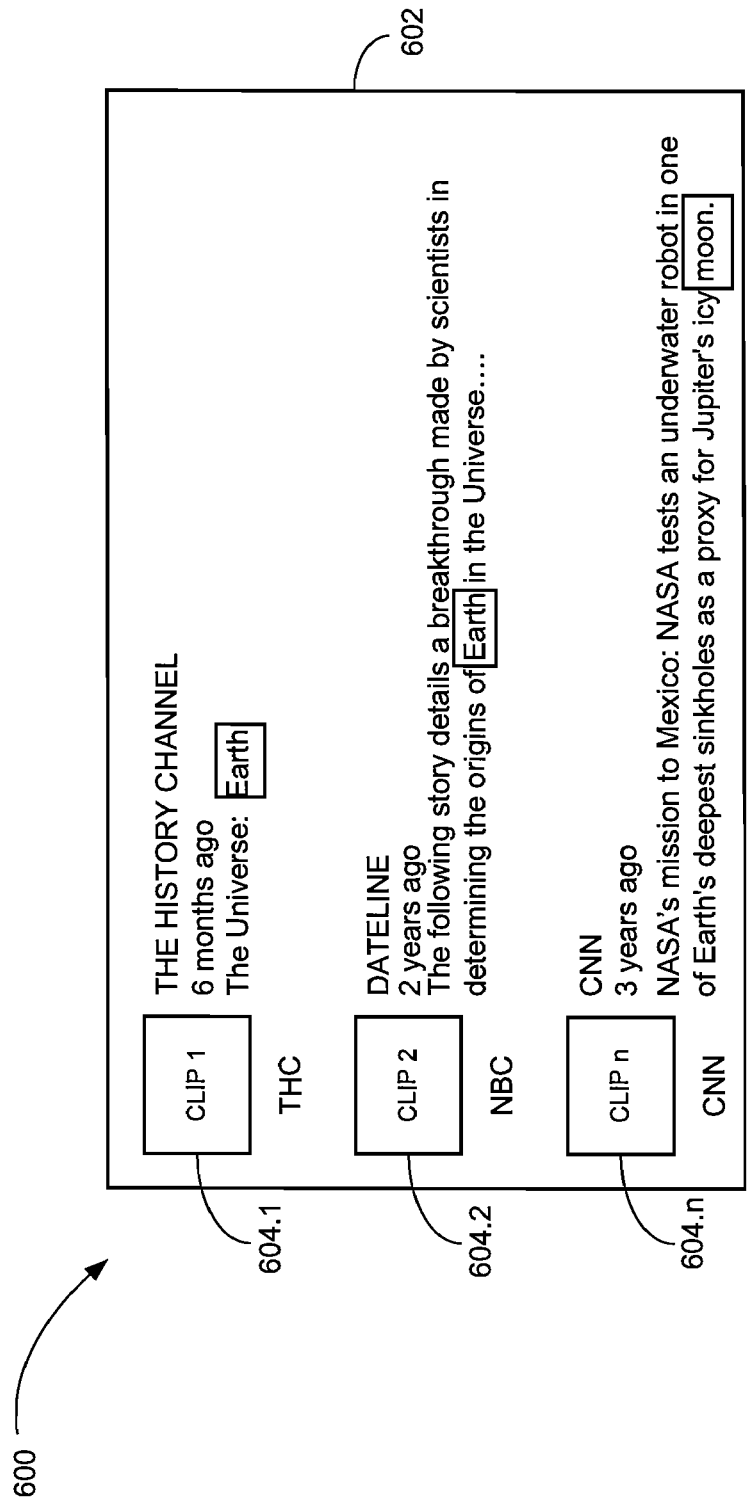

FIG. 6 illustrates an example of a user interface 600 that may be provided on a display of the display device 106.1, 106.2 (see FIG. 1) when deployed in the content system 100. Other devices in the content system 100 or different systems may also be used.

The user interface 600 may provide a result 602 of the query to the information source 112. A number of available selections 604.1-604.$n$ may be available within the result 602 to provide a user with the availability to receive additional content. The available selections 604.1-604.$n$ may be a video archive with video on demand (VOD) content, available video clips from a number of sites, one or more maps, live video (e.g., television shows or movies) information from encyclopaedic sources, and/or different types of video and/or non-video content.

Figure 7:
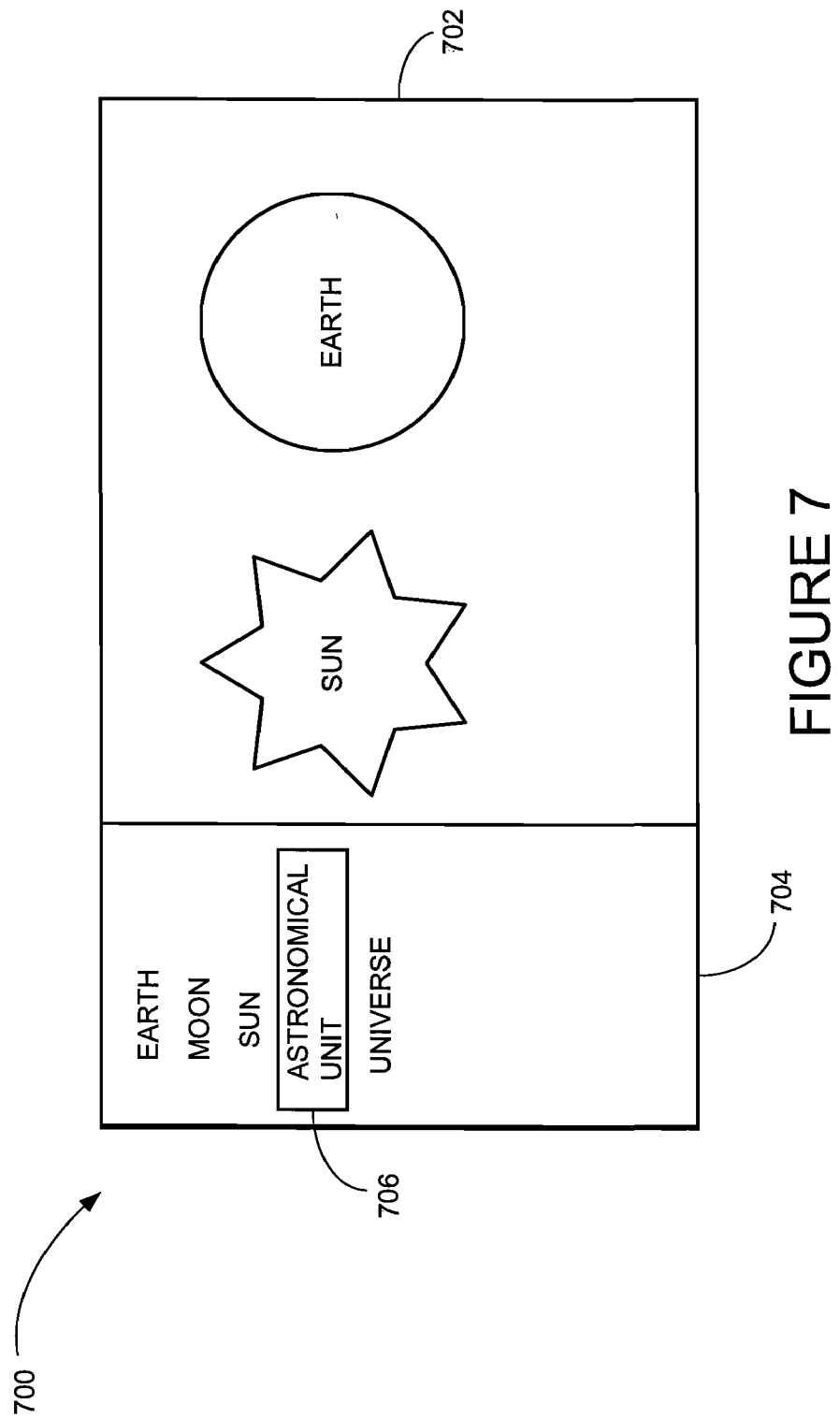

FIG. 7 illustrates an example of a user interface 700 that may be provided on a display of the display device 106.1, 106.2 (see FIG. 1) when deployed in the content system 100. Other devices in the content system 100 or different systems may also be used.

The user interface 700 may include content 702 along with past query results 704. A result 706 of the past query results may be selected to provide the result of the past query and/or to rerun the query with the information source 102.

Figure 8:
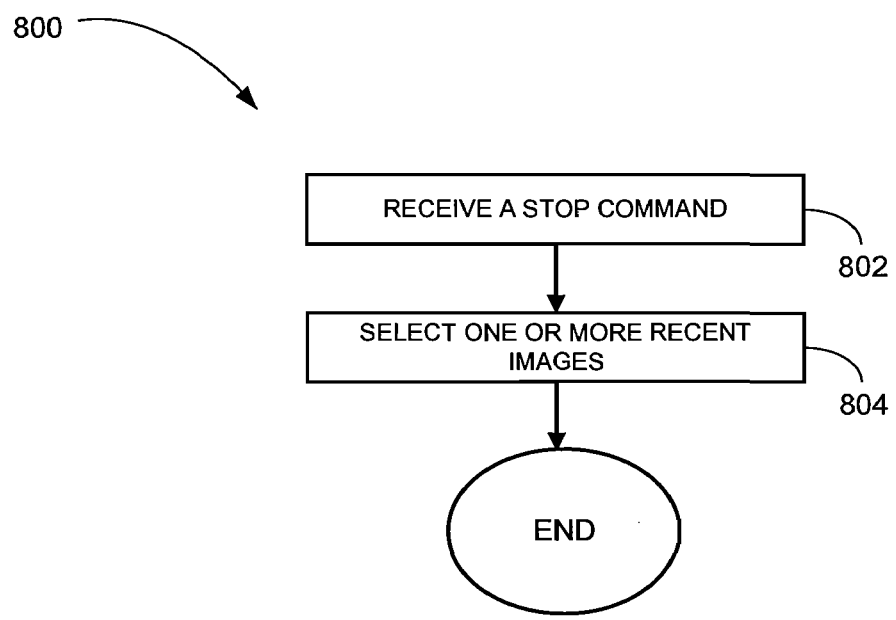
FIG. 8 is a flowchart illustrating a method for accessing one or more recent images in accordance with an example embodiment.

FIG. 8 illustrates a method 800 for accessing one or more recent images according to an example embodiment. The method 800 may be performed at block 302 (see FIG. 3) or otherwise performed.

A stop command is received at block 802. The stop command may be received from a remote control or other device to define a location in the video signal for selection of one or more recent images. The recent images may include a current image presented on a display and/or one or more preceding images or may be otherwise selected. The recent images of the video signal may be selected in accordance with the stop command at block 804.

Figure 9:
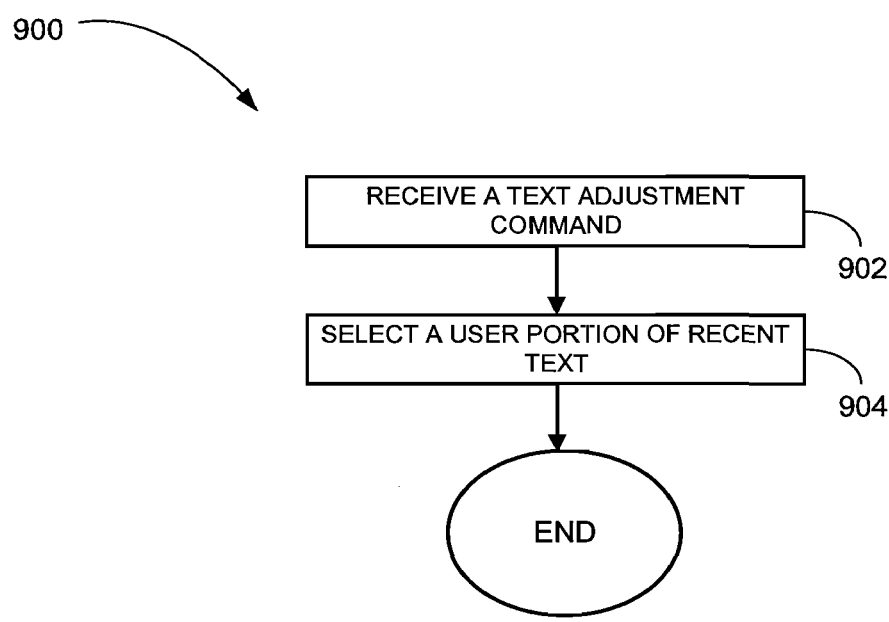
FIGS. 9-12 are flowcharts illustrating a method for receiving a selection of a user portion of recent text in accordance with an example embodiment.

FIG. 9 illustrates a method 900 for receiving a selection of a user portion of recent text according to an example embodiment. The method 900 may be performed at block 310 (see FIG. 3) or otherwise performed.

A text adjustment command is received for the recent text at block 902. The text adjustment command may be used to select a different portion of the recent text (e.g., than the original user portion selected during the operations at block 310). For example, a different term or phrase of the recent text may be selected using the text adjustment command.

The user portion of the recent text is selected in accordance with the text adjustment command at block 904.

Figure 10:
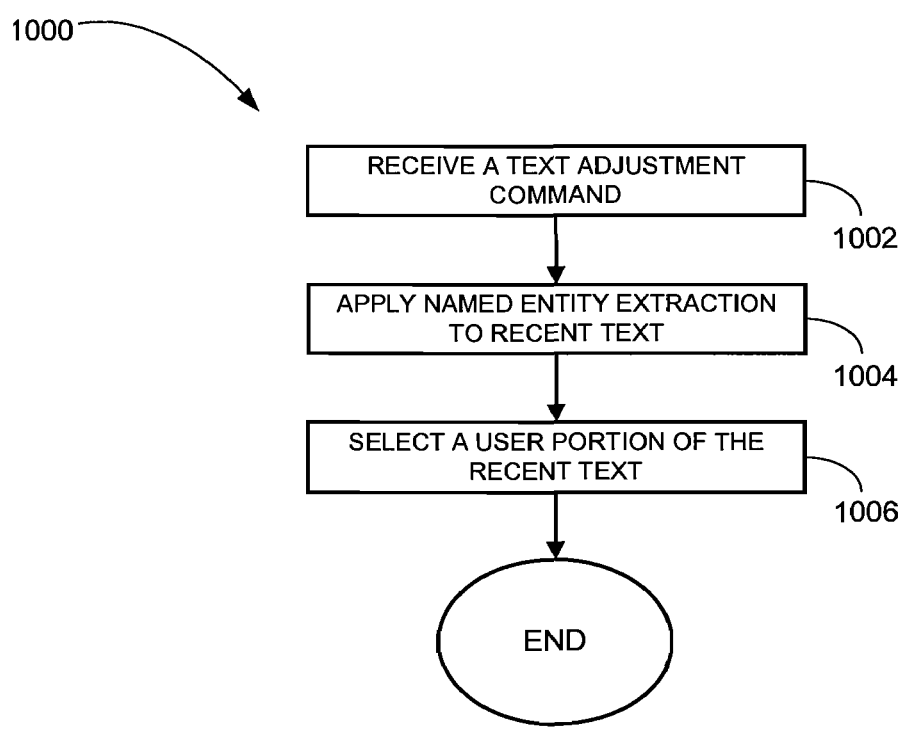

FIG. 10 illustrates a method 1000 for receiving a selection of a user portion of recent text according to an example embodiment. The method 1000 may be performed at block 310 (see FIG. 3) or otherwise performed.

A text adjustment command is received for the recent text at block 1002. Named entity extraction is applied to the recent text at block 1004. Named entity extraction may, by way of example, select only place names from among the recent text. Other types of selections may also be performed using named entity extraction.

At block 1006, the user portion of the recent text is selected in accordance with the text adjustment command and the named entity extraction.

Figure 11:
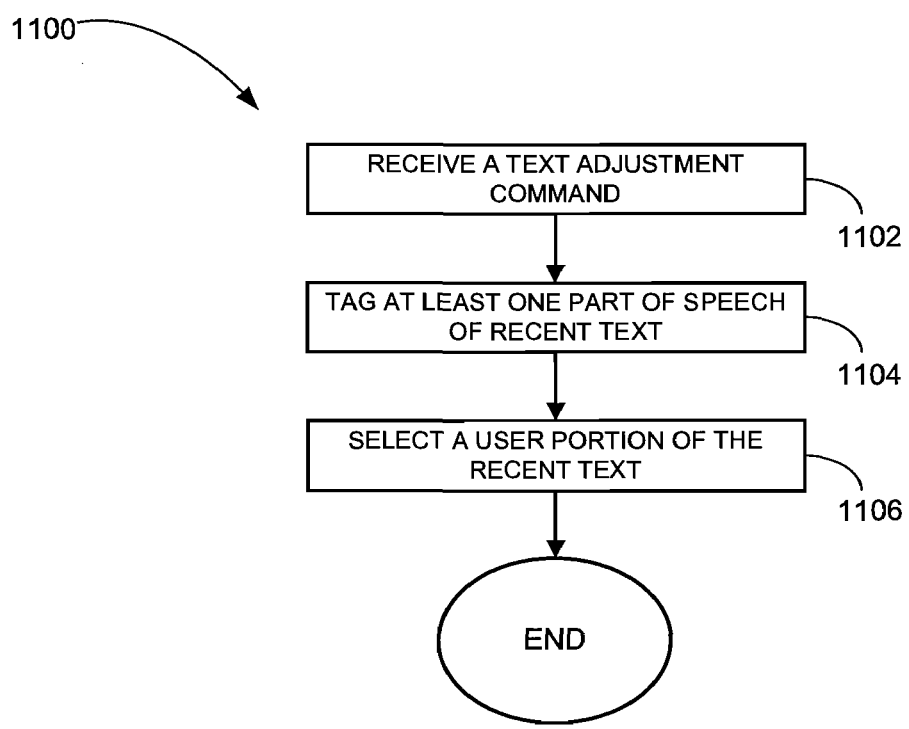

FIG. 11 illustrates a method 1100 for receiving a selection of a user portion of recent text according to an example embodiment. The method 1100 may be performed at block 310 (see FIG. 3) or otherwise performed.

A text adjustment command is received for the recent text at block 1102. One or more parts of speech of the recent text are tagged at block 1104. Tagging may enable certain parts of speech (e.g., verbs) to be ignored during selection of the user portion of the recent text.

At block 1106, the user portion of the recent text is selected in accordance with the text adjustment command and tagging of at least one part of speech of the recent text.

Figure 12:
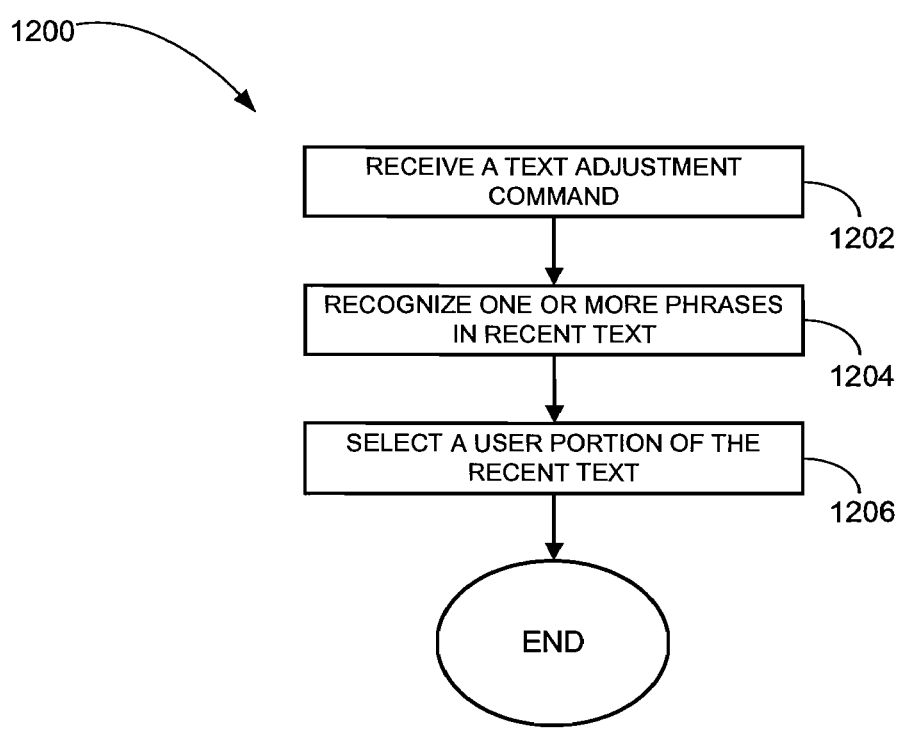

FIG. 12 illustrates a method 1200 for receiving a selection of a user portion of recent text according to an example embodiment. The method 1200 may be performed at block 310 (see FIG. 3) or otherwise performed.

A text adjustment command is received for the recent text at block 1202. One or more phrases are recognized in the recent text at block 1204. Phrases may be recognized, by way of example, by use of statistical language modules (e.g., N-gram likelihoods).

At block 1206, the user portion of the recent text is selected in accordance with the text adjustment command and recognition of the one or more phrases in the recent text.

Figure 13:
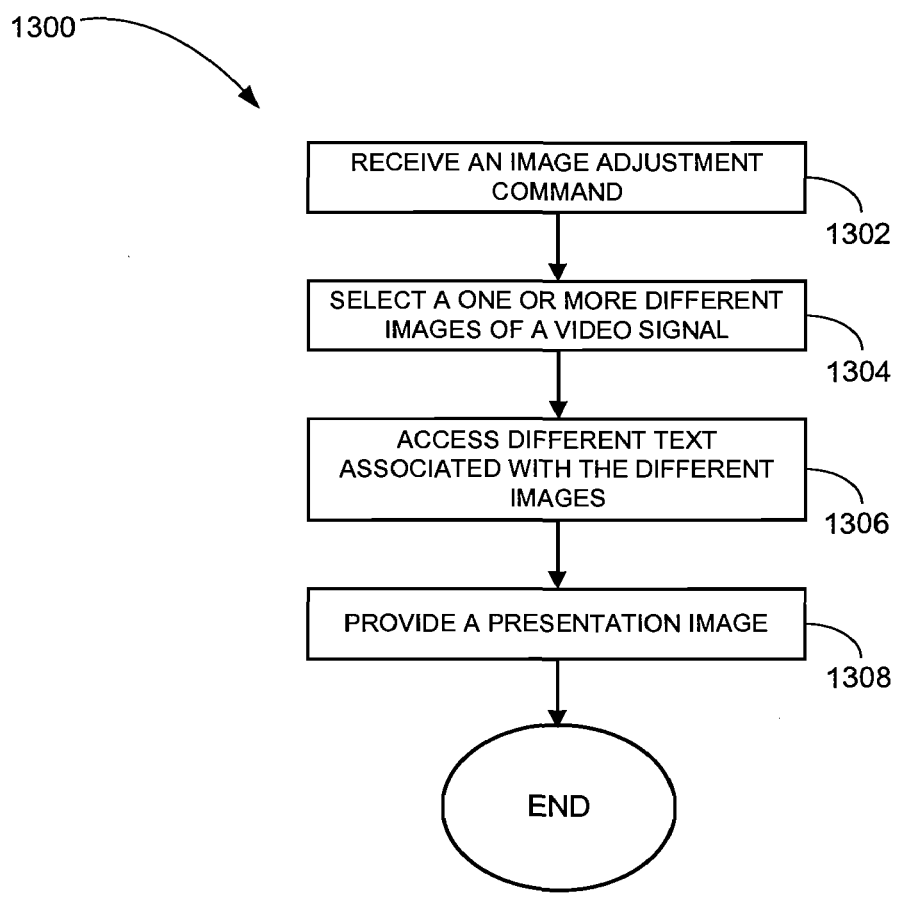
FIG. 13 is a flowchart illustrating a method for providing a presentation image in accordance with an example embodiment.

FIG. 13 illustrates a method 1300 for providing a presentation image according to an example embodiment. The method 1300 may be performed at block 308 (see FIG. 3) or otherwise performed.

An image selection command is received at block 1302. The image selection command may select one or more different images for selection as the recent images and/or a different image for the presentation image. The image selection command may include, by way of example, rewinding or fast forwarding a position in the video signal. For example, the image selection command may scan backward or forward in the video signal to enable selection of one or more different images (e.g., and thereby different text associated with the different images). The image selection command may be received from a remote control or otherwise received.

At least one different image of the video signal is selected in accordance with the image selection command at block 1304.

Different text associated with the at least one different image is accessed at block 1306.

The presentation image, the different text, and/or recent text is provided from the least one different image for presentation on the display at block 1308. The original portion of the different text may be identified for presentation within the presentation image.

Figure 14:
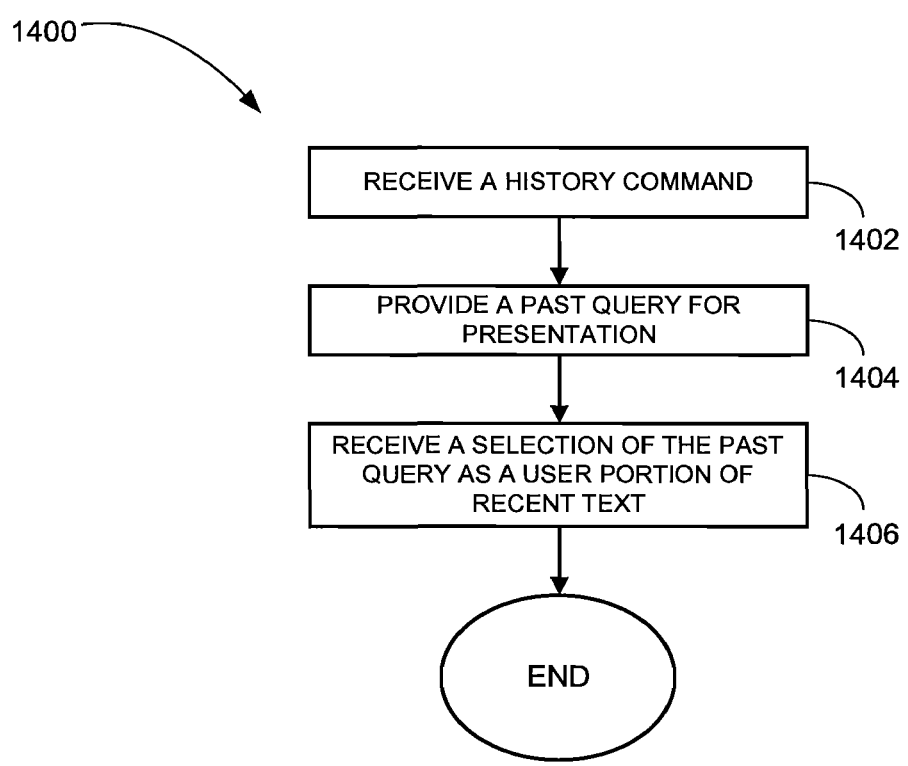
FIGS. 14 and 15 are flowcharts illustrating a method for receiving a selection of a user portion of recent text in accordance with an example embodiment.

FIG. 14 illustrates a method 1400 for receiving a selection of a user portion of recent text according to an example embodiment. The method 1400 may be performed at block 310 (see FIG. 3) or otherwise performed.

A history command is received at block 1402. The history command may be a request for one or more past queries previously made by a user.

A past query is provided for presentation at block 1404. The selection of the past query as the user portion of the recent text is received at block 1406.

Figure 15:
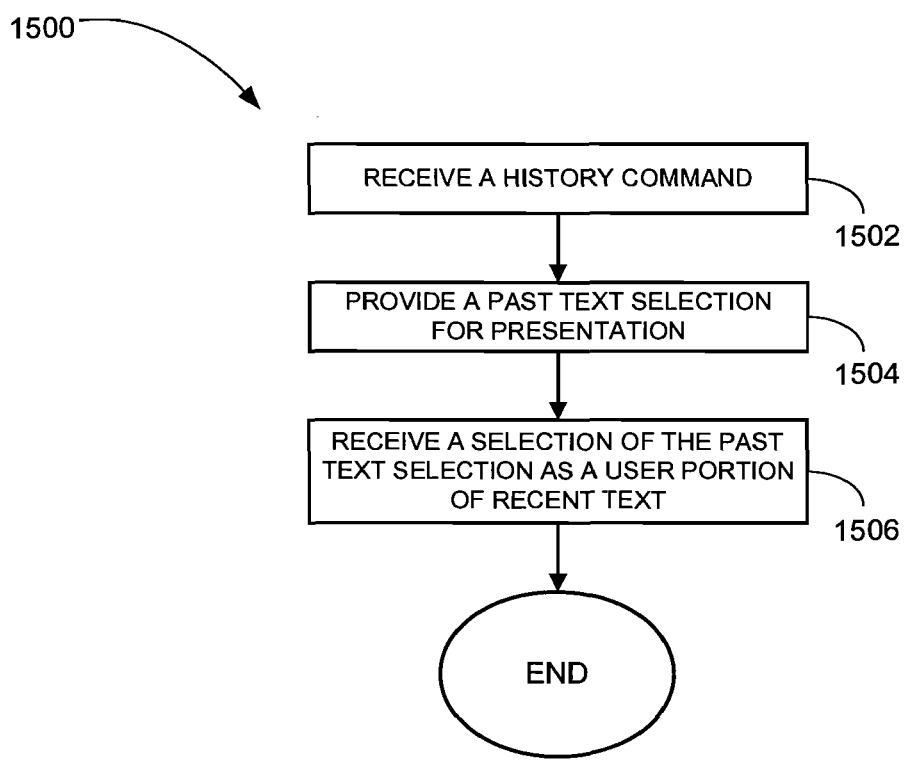

FIG. 15 illustrates a method 1500 for receiving a selection of a user portion of recent text according to an example embodiment. The method 1500 may be performed at block 310 (see FIG. 3) or otherwise performed.

A history command is received at block 1502. The history command may be a request for one or more past text selections previously made by a user.

A past text selection is provided for presentation at block 1504. The selection of the past text selection as the user portion of the recent text is received at block 1506.

Figure 16:
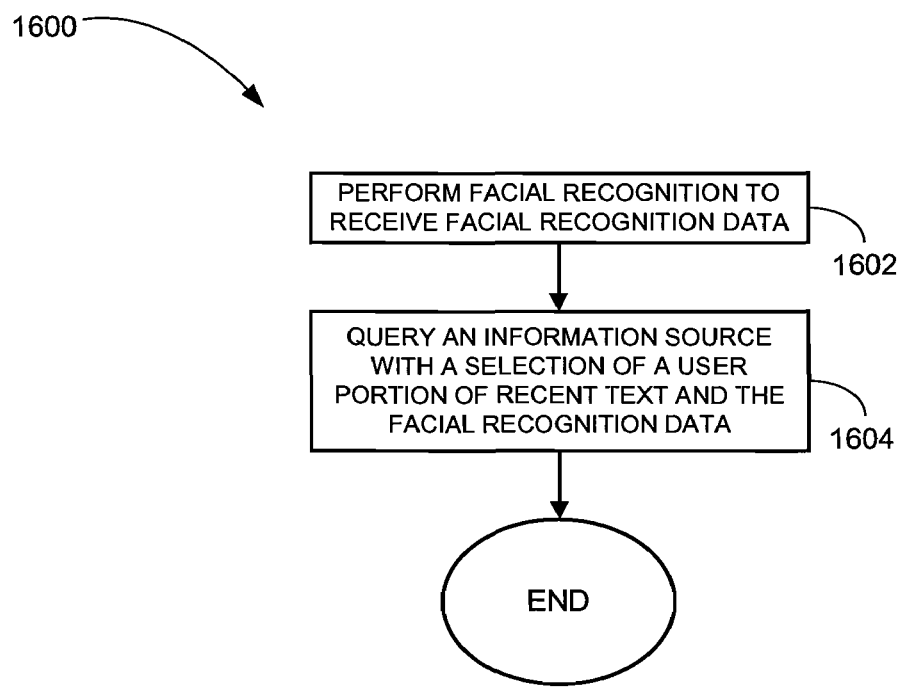
FIGS. 16 and 17 are flowcharts illustrating a method for querying an information source in accordance with an example embodiment.

FIG. 16 illustrates a method 1600 for querying an information source according to an example embodiment. The method 1600 may be performed at block 316 (see FIG. 3) or otherwise performed.

Facial recognition is performed on the one or more recent image to receive facial recognition data at block 1602. The information source is queried with a selection of the user portion of recent text and the facial recognition data at block 1604.

Figure 17:
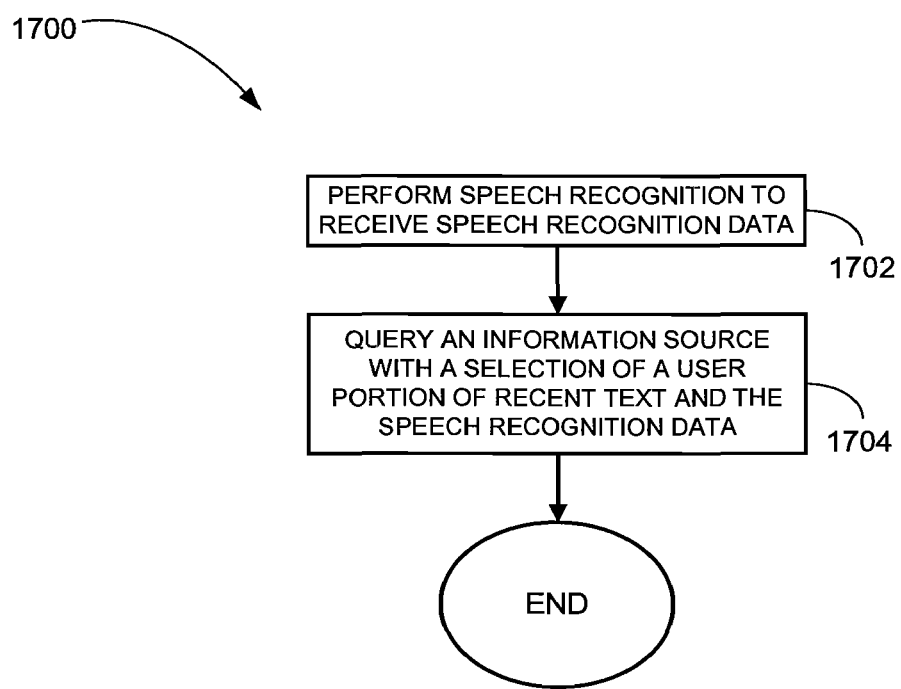

FIG. 17 illustrates a method 1700 for querying an information source according to an example embodiment. The method 1700 may be performed at block 312 (see FIG. 3) or otherwise performed.

Speech recognition is performed on an audio portion of the video signal related to one or more recent images to receive speech recognition data at block 1702. The information source is queried with the selection of a user portion of recent text and the speech recognition data at block 1704.

Figure 18:
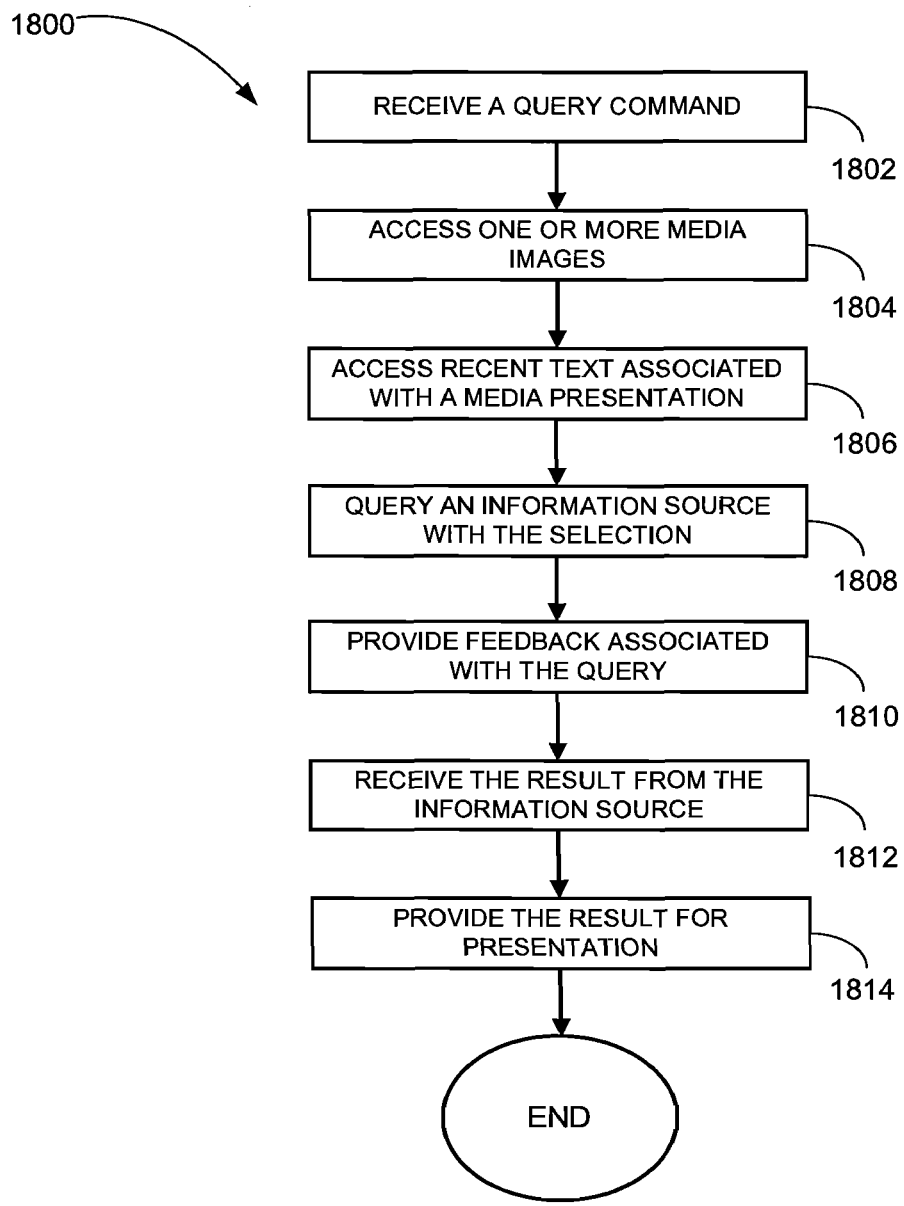
FIGS. 18 and 19 are flowcharts illustrating a method for information querying in accordance with an example embodiment.

FIG. 18 illustrates a method 1800 for information querying according to an example embodiment. The method 1800 may be performed by the content controller 110 of the content system 100 (see FIG. 1) or otherwise performed.

A query command is received at block 1802. The query command may be received from a remote control or otherwise received.

One or more media images associated with a media presentation are accessed at block 1804. The media presentation may include an audio signal, a video signal, and/or one or more embedded images (e.g., of the video signal), one or more accessed images (e.g., from a web site). For example, the media presentation may include an audio podcast that includes a number of media images corresponding to chapters or topic segments of the podcast. The media presentation may contain a single media image such as the 'box art' that is typically displayed while the audio signal is played out. The media presentation may be audio only and a default image may be displayed (e.g., during the accessing of the recent text). The one or more media images. In an example embodiment, the one or more media images may include an icon or other image that is not extracted from the media presentation but is used, by way of an example, to signal availability of recent text associated with the media presentation.

In an example embodiment, a video adjustment command may be used to select a media presentation from a source presentation. For example, the source presentation may be a video signal and the media presentation selected by use of the video adjustment command may be a video clip and/or a zoomed portion of the video signal. Other types of media presentations may also be selected from the source presentation using the video adjustment command.

Recent text associated with the media presentation is accessed at block 1806. The recent text may be accessed from accessing closed captioning from the media presentation and/or a transcript associated with the one or more media images of the media presentation. The recent text may be accessed by performing optical character recognition (OCR) on the one or more media images of the media presentation and/or by performing speech recognition on the audio portion of the media presentation. The recent text may also be received in other ways.

An information source is queried with a portion of the recent text at block 1808. The information source may be capable of using the portion to provide a result. The portion may be a partial portion or an entire portion of the recent text. The portion of the recent text may include one or more keywords identified from the recent text as the portion of the recent text.

Feedback regarding the querying of the information source may be provided at block 1810. The feedback may include, by way of example, a portion of the recent text, the recent text, a querying indication that the querying of the information is being performed, and/or a results indication that the result of the information source has been provided. Other types of feedback may also be provided.

The result from the information source may be provided in response to the query at block 1812.

The result may be provided for presentation on the display at block 1814. The result may include, by way of example, text data, image data, audio data, and/or video data.

Figure 19:
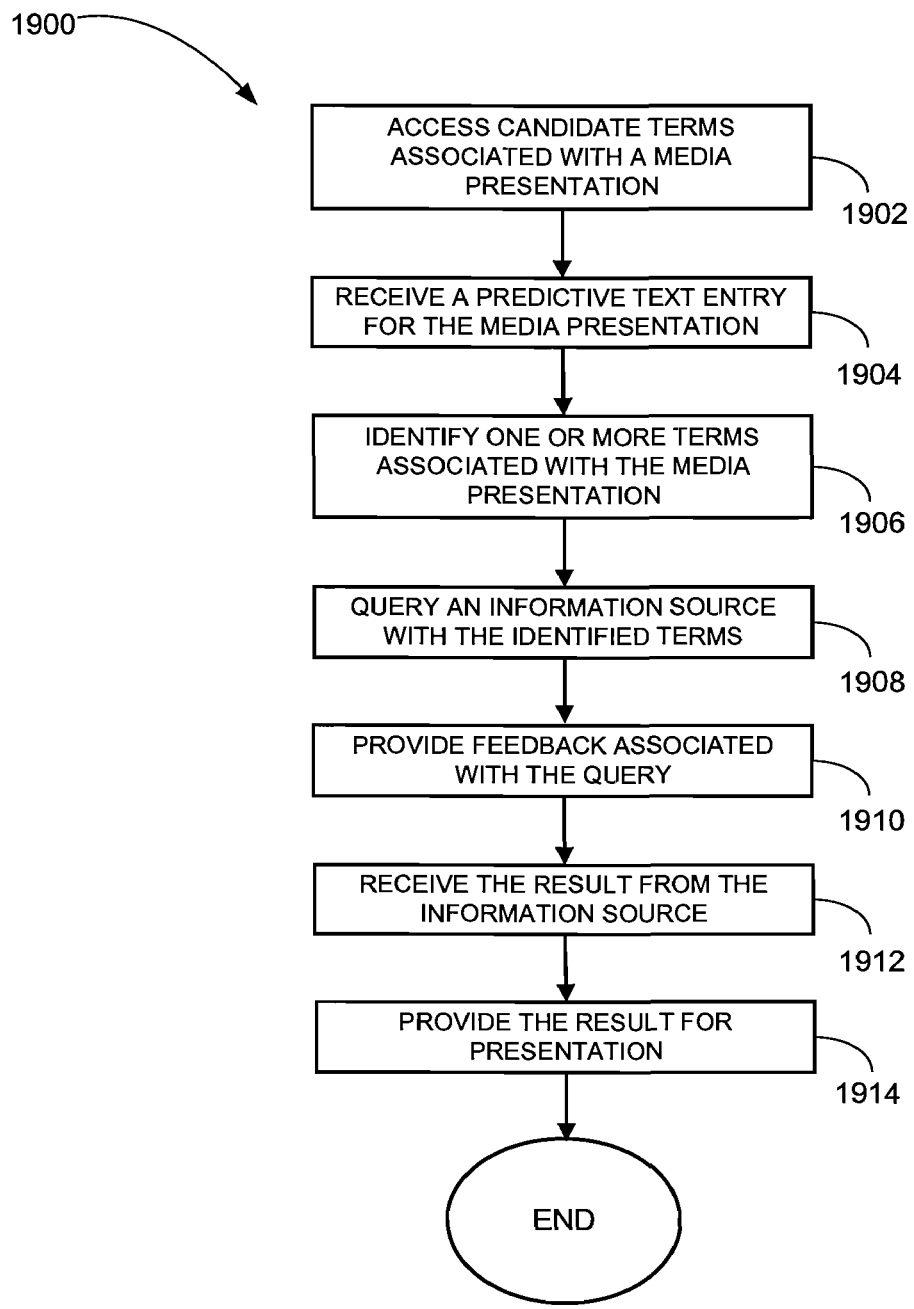

FIG. 19 illustrates a method 1900 for information querying according to an example embodiment. The method 1900 may be performed by the content controller 110 of the content system 100 (see FIG. 1) or otherwise performed.

One or more candidate terms associated with a media presentation are accessed at block 1902. The candidate terms may include one or more terms that a user may be likely to use for a query of the information source 112.

A predictive text entry is received for the media presentation at block 1904. The predictive text entry may include one or more characters at a start of a term or phrase that is associated with the media presentation. For example, the predictive text may be used instead of receiving an entire term or phrase.

At block 1906, one or more terms associated with the media presentation are identified based on the candidate terms and the predictive text entry. For example, the one or more characters of the predictive text entry may be matched against the candidate terms based on closest match, most popular match, most likely match, social networking (e.g., past matching selections by previous users) and the like. Other matching techniques may also be used.

In an example embodiment, the one or more identified terms may be provided for presentation and a selection of one or more identified terms may be made for querying.

In an example embodiment, an additional predictive text entry may be received. One or more terms associated with the media presentation may be identified based on the candidate terms and the additional predictive text entry. The one or more newly identified terms may be used for querying.

The information source 112 is queried with the one or more identified terms at block 1908.

Feedback regarding the querying of the information source may be provided at block 1910. The feedback may include, by way of example, a portion of the predictive text entry, the predictive text entry, a querying indication that the querying of the information is being performed, and/or a results indication that the result of the information source has been provided. Other types of feedback may also be provided.

The result from the information source may be provided in response to the query at block 1912.

The result may be provided for presentation on the display at block 1914. The result may include, by way of example, text data, image data, audio data, and/or video data.

Figure 20:
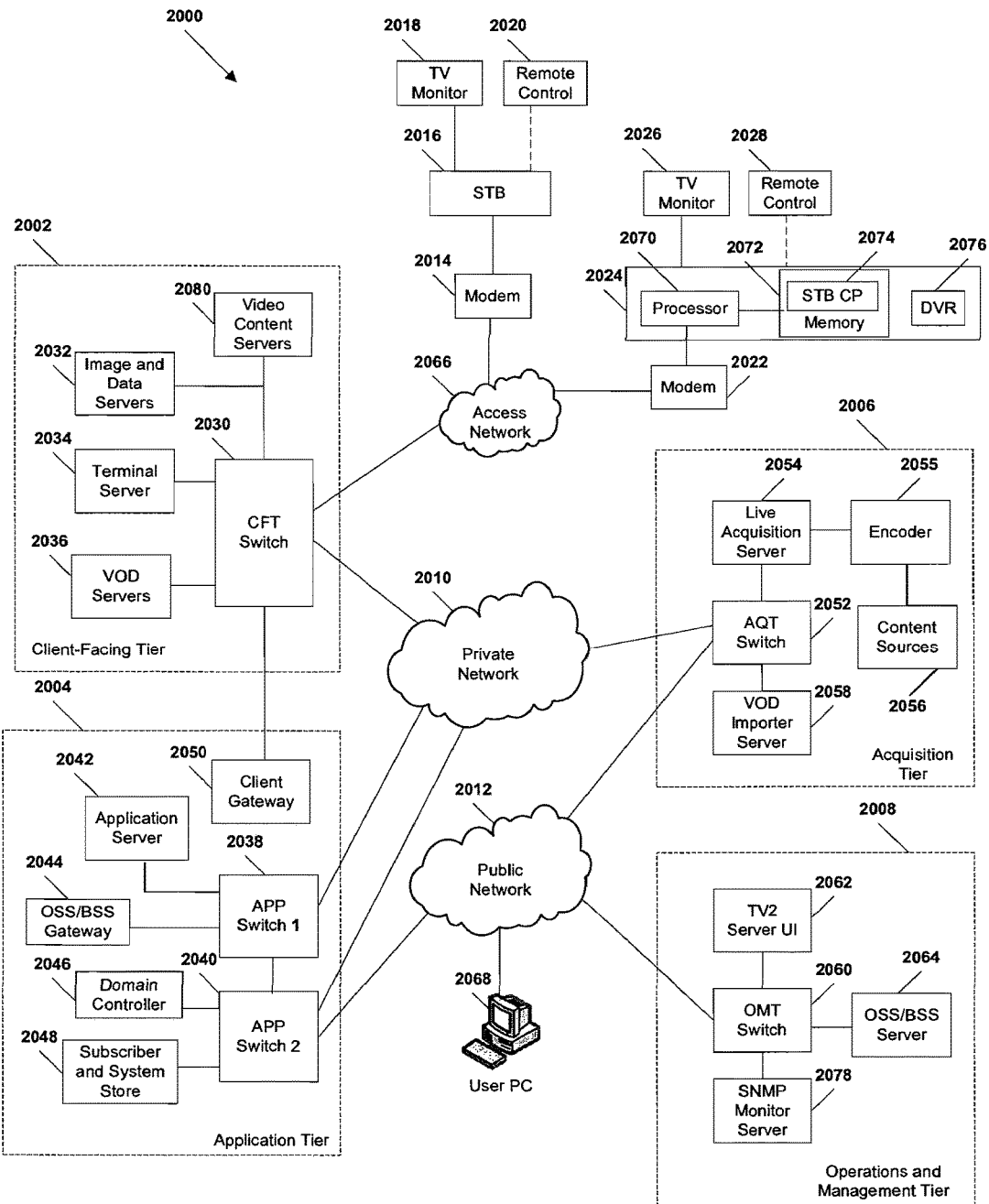
FIG. 20 is a block diagram of an IPTV system in which the content system of FIG. 1 may be deployed in accordance with an example embodiment.

FIG. 20 illustrates an example embodiment of an Internet Protocol Television (IPTV) system 2000 in which the content system 100 may be deployed. However, the content system 100 may be deployed in other types of IPTV and non-IPTV video systems.

The system 2000 as illustrated may include a client facing tier 2002, an application tier 2004, an acquisition tier 2006, and an operations and management tier 2008. Some tiers 2002, 2004, 2006, 2008 may be coupled to a private network 2010; to a public network 2012, such as the Internet; or to both the private network 2010 and the public network 2012. For example, the client-facing tier 2002 may be coupled to the private network 2010. Further, the application tier 2004 may be coupled to the private network 2010 and to the public network 2012. The acquisition tier 2006 may also be coupled to the private network 2010 and to the public network 2012. Additionally, the operations and management tier 2008 may be coupled to the public network 2012.

As illustrated in FIG. 20, some of the various tiers 2002, 2004, 2006, 2008 may communicate with each other via the private network 2010 and the public network 2012. For instance, the client-facing tier 2002 may communicate with the application tier 2004 and the acquisition tier 2006 via the private network 2010. The application tier 2004 may also communicate with the acquisition tier 2006 via the private network 2010. Further, the application tier 2004 may communicate with the acquisition tier 2006 and the operations and management tier 2008 via the public network 2012. Moreover, the acquisition tier 2006 may communicate with the operations and management tier 2008 via the public network 2012. In a particular As illustrated in FIG. 20, the client-facing tier 2002 may communicate with user equipment via a private access network 2066 (e.g., the provider network 104 of FIG. 1), such as an Internet Protocol Television (IPTV) access network. In an illustrative embodiment, modems, such as a first modem 2014 and a second modem 2022 may be coupled to the private access network 2066. The client-facing tier 2002 may communicate with a first representative set-top box device 2016 via the first modem 2014 and with a second representative set-top box device 2024 via the second modem 2022. The client-facing tier 2002 may communicate with a large number of set-top boxes, such as the representative set-top boxes 2016, 2024, (e.g., the receiver device 108 of FIG. 1) over a wide geographic area, such as a regional area, a metropolitan area, a viewing area, a designated market area or any other suitable geographic area, market area, or subscriber or customer group that may be supported by networking the client-facing tier 2002 to numerous set-top box devices. In an illustrative embodiment, the client-facing tier, or any portion thereof, may be included at a video head-end office.

In a particular embodiment, the client-facing tier 2002 may be coupled to the modems 2014, 2022 via fiber optic cables. Alternatively, the modems 2014 and 2022 may be digital subscriber line (DSL) modems that are coupled to one or more network nodes via twisted pairs, and the client-facing tier 2002 may be coupled to the network nodes via fiber-optic cables. Each set-top box device 2016, 2024 may process data received via the private access network 2066, via an IPTV software platform, such as Microsoft® TV IPTV Edition. In another embodiment, representative set-top boxes 2016, 2024 may receive data from private access network 2066 through RF and other cable and/or satellite based networks.

Additionally, the first set-top box device 2016 may be coupled to a first external display device, such as a first television monitor 2018, and the second set-top box device 2024 may be coupled to a second external display device, such as a second television monitor 2026. Moreover, the first set-top box device 2016 may communicate with a first remote control 2020, and the second set-top box device may communicate with a second remote control 2028.

In an example, non-limiting embodiment, one or more of set-top box devices 2016, 2024 may receive video content, which may include video and audio portions, from the client-facing tier 2002 via the private access network 2066. The set-top boxes 2016, 2024 may transmit the video content to an external display device, such as the television monitors 2018, 2026. Further, some of the set-top box devices 2016, 2024 may include a STB processor, such as STB processor 2070, and a STB memory device, such as STB memory 2072, which is accessible to the STB processor 2070. In one embodiment, a computer program, such as the STB computer program 2074, may be embedded within the STB memory device 2072. Some set-top box devices 2016, 2024 may also include a video content storage module, such as a digital video recorder (DVR) 2076. In a particular embodiment, the set-top box devices 2016, 2024 may communicate commands received from the remote control devices 2020, 2028 to the client-facing tier 2002 via the private access network 2066.

In an illustrative embodiment, the client-facing tier 2002 may include a client-facing tier (CFT) switch 2030 that manages communication between the client-facing tier 2002 and the private access network 2066 and between the client-facing tier 2002 and the private network 2010. As shown, the CFT switch 2030 is coupled to one or more image and data servers 2032 that store still images associated with programs of various IPTV channels. The image and data servers 2032 may also store data related to various channels, e.g., types of data related to the channels and to programs or video content displayed via the channels. In an illustrative embodiment, the image and data servers 2032 may be a cluster of servers, some of which may store still images, channel and program-related data, or any combination thereof. The CFT switch 2030 may also be coupled to a terminal server 2034 that provides terminal devices with a connection point to the private network 2010. In a particular embodiment, the CFT switch 2030 may also be coupled to one or more video-on-demand (VOD) servers 2036 that store or provide VOD content imported by the IPTV system 2000. In an illustrative, non-limiting embodiment, the VOD content servers 2080 may include one or more unicast servers.

The client-facing tier 2002 may also include one or more video content servers 2080 that transmit video content requested by viewers via their set-top boxes 2016, 2024. In an illustrative, non-limiting embodiment, the video content servers 2080 may include one or more multicast servers.

As illustrated in FIG. 20, the application tier 2004 may communicate with both the private network 2010 and the public network 2012. The application tier 2004 may include a first application tier (APP) switch 2038 and a second APP switch 2040. In a particular embodiment, the first APP switch 2038 may be coupled to the second APP switch 2040. The first APP switch 2038 may be coupled to an application server 2042 and to an OSS/BSS gateway 2044. In a particular embodiment, the application server 2042 may provide applications to the set-top box devices 2016, 2024 via the private access network 2066, which enable the set-top box devices 2016, 2024 to provide functions, such as display, messaging, processing of IPTV data and VOD material, etc. In a particular embodiment, the OSS/BSS gateway 2044 includes operation systems and support (OSS) data, as well as billing systems and support (BSS) data. In one embodiment, the OSS/BSS gateway may provide or restrict access to an OSS/BSS server 2064 that stores operations and billing systems data.

Further, the second APP switch 2040 may be coupled to a domain controller 2046 that provides web access, for example, to users via the public network 2012. For example, the domain controller 2046 may provide remote web access to IPTV account information via the public network 2012, which users may access using their personal computers 2068. The second APP switch 2040 may be coupled to a subscriber and system store 2048 that includes account information, such as account information that is associated with users who access the system 2000 via the private network 2010 or the public network 2012. In a particular embodiment, the application tier 2004 may also include a client gateway 2050 that communicates data directly with the client-facing tier 2002. In this embodiment, the client gateway 2050 may be coupled directly to the CFT switch 2030. The client gateway 2050 may provide user access to the private network 2010 and the tiers coupled thereto.

In a particular embodiment, the set-top box devices 2016, 2024 may access the IPTV system 2000 via the private access network 2066, using information received from the client gateway 2050. In this embodiment, the private access network 2066 may provide security for the private network 2010. User devices may access the client gateway 2050 via the private access network 2066, and the client gateway 2050 may allow such devices to access the private network 2010 once the devices are authenticated or verified. Similarly, the client gateway 2050 may prevent unauthorized devices, such as hacker computers or stolen set-top box devices from accessing the private network 2010, by denying access to these devices beyond the private access network 2066.

For example, when the first representative set-top box device 2016 accesses the system 2000 via the private access network 2066, the client gateway 2050 may verify subscriber information by communicating with the subscriber and system store 2048 via the private network 2010, the first APP switch 2038, and the second APP switch 2040. Further, the client gateway 2050 may verify billing information and status by communicating with the OSS/BSS gateway 2044 via the private network 2010 and the first APP switch 2038. In one embodiment, the OSS/BSS gateway 2044 may transmit a query across the first APP switch 2038, to the second APP switch 2040, and the second APP switch 2040 may communicate the query across the public network 2012 to the OSS/BSS server 2064. After the client gateway 2050 confirms subscriber and/or billing information, the client gateway 2050 may allow the set-top box device 2016 access to IPTV content and VOD content. If the client gateway 2050 is unable to verify subscriber information for the set-top box device 2016, e.g., because it is connected to an unauthorized twisted pair, the client gateway 2050 may block transmissions to and from the set-top box device 2016 beyond the private access network 2066.

As indicated in FIG. 20, the acquisition tier 2006 includes an acquisition tier (AQT) switch 2052 that communicates with the private network 2010. The AQT switch 2052 may also communicate with the operations and management tier 2008 via the public network 2012. In a particular embodiment, the AQT switch 2052 may be coupled to a live acquisition server 2054 that receives television or movie content, for example, from content sources 2056 through an encoder 2055. In a particular embodiment during operation of the IPTV system, the live acquisition server 2054 may acquire television or movie content. The live acquisition server 2054 may transmit the television or movie content to the AQT switch 2052 and the AQT switch 2052 may transmit the television or movie content to the CFT switch 2030 via the private network 2010.

Further, the television or movie content may be transmitted to the video content servers 2080, where it may be encoded, formatted, stored, or otherwise manipulated and prepared for communication to the set-top box devices 2016, 2024. The CFT switch 2030 may communicate the television or movie content to the modems 2014, 2022 via the private access network 2066. The set-top box devices 2016, 2024 may receive the television or movie content via the modems 2014, 2022, and may transmit the television or movie content to the television monitors 2018, 2026. In an illustrative embodiment, video or audio portions of the television or movie content may be streamed to the set-top box devices 2016, 2024.

Further, the AQT switch may be coupled to a video-on-demand importer server 2058 that stores television or movie content received at the acquisition tier 2006 and communicates the stored content to the VOD server 2036 at the client-facing tier 2002 via the private network 2010. Additionally, at the acquisition tier 2006, the video-on-demand (VOD) importer server 2058 may receive content from one or more VOD sources outside the IPTV system 2000, such as movie studios and programmers of non-live content. The VOD importer server 2058 may transmit the VOD content to the AQT switch 2052, and the AQT switch 2052, in turn, may communicate the material to the CFT switch 2030 via the private network 2010. The VOD content may be stored at one or more servers, such as the VOD server 2036.

When user issue requests for VOD content via the set-top box devices 2016, 2024, the requests may be transmitted over the private access network 2066 to the VOD server 2036, via the CFT switch 2030. Upon receiving such requests, the VOD server 2036 may retrieve the requested VOD content and transmit the content to the set-top box devices 2016, 2024 across the private access network 2066, via the CFT switch 2030. The set-top box devices 2016, 2024 may transmit the VOD content to the television monitors 2018, 2026. In an illustrative embodiment, video or audio portions of VOD content may be streamed to the set-top box devices 2016, 2024.

FIG. 20 further illustrates that the operations and management tier 2008 may include an operations and management tier (OMT) switch 2060 that conducts communication between the operations and management tier 2008 and the public network 2012. In the embodiment illustrated by FIG. 20, the OMT switch 2060 is coupled to a TV2 server 2062. Additionally, the OMT switch 2060 may be coupled to an OSS/BSS server 2064 and to a simple network management protocol (SNMP) monitor 2078 that monitors network devices within or coupled to the IPTV system 2000. In a particular embodiment, the OMT switch 2060 may communicate with the AQT switch 2052 via the public network 2012.

In an illustrative embodiment, the live acquisition server 2054 may transmit the television or movie content to the AQT switch 2052, and the AQT switch 2052, in turn, may transmit the television or movie content to the OMT switch 2060 via the public network 2012. In this embodiment, the OMT switch 2060 may transmit the television or movie content to the TV2 server 2062 for display to users accessing the user interface at the TV2 server 2062. For example, a user may access the TV2 server 2062 using a personal computer (PC) 2068 coupled to the public network 2012.

Figure 21:
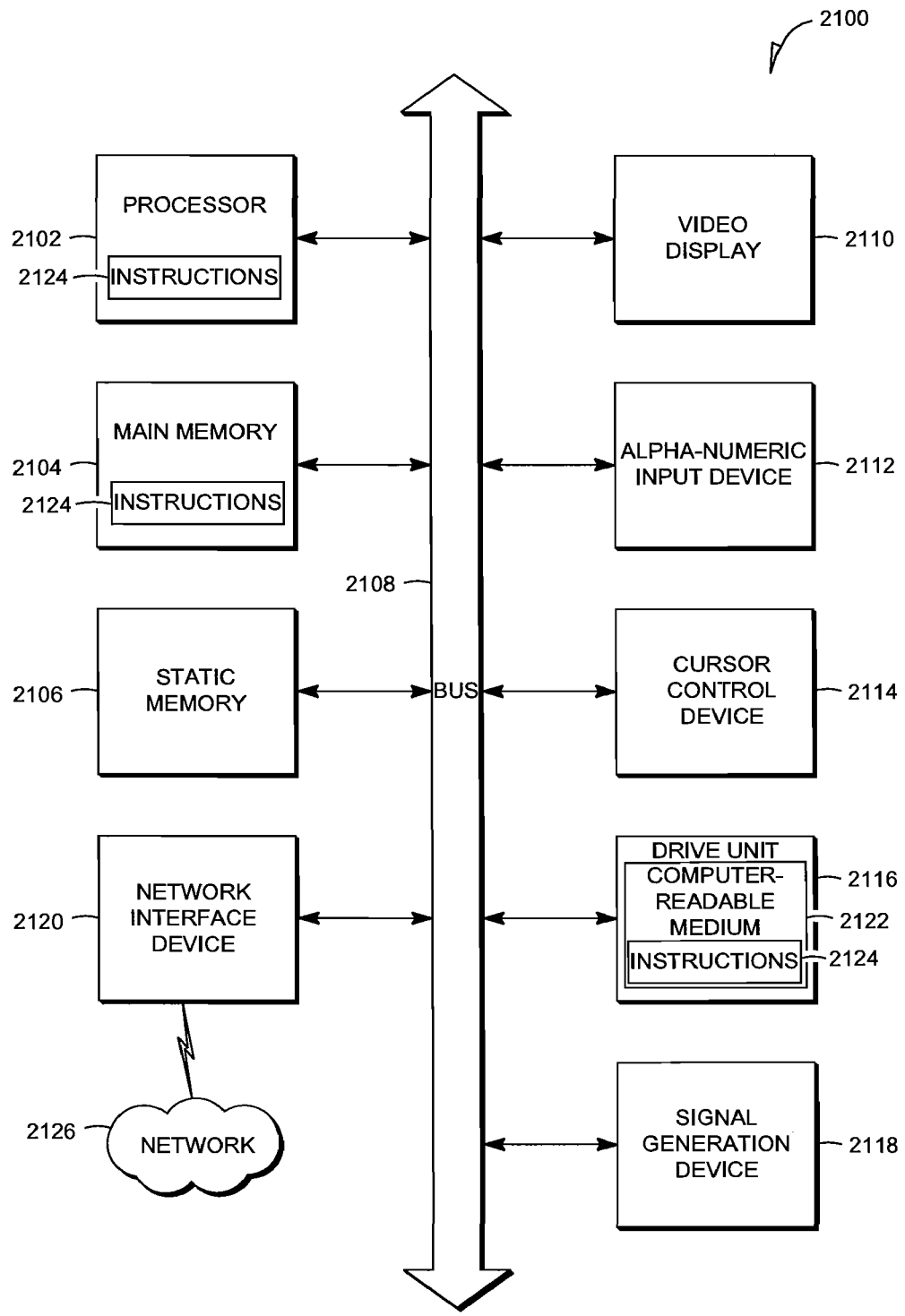
FIG. 21 illustrates a diagrammatic representation of a machine in the example form of a computer system within which a set of instructions for causing the machine to perform any one or more of the methodologies discussed herein may be executed.

FIG. 21 shows a diagrammatic representation of machine in the example form of a computer system 2100 within which a set of instructions may be executed causing the machine to perform any one or more of the methods, processes, operations, or methodologies discussed herein. The information source 112 and/or the video signal source 102 may be deployed on the computer system 2100. The display device 106.1, 106.2, and/or the receiver device 108 may include the functionality of the computer system 2100.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU) a graphics processing unit (GPU) or both), a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard), a cursor control device 2114 (e.g., a mouse), a drive unit 2116, a signal generation device 2118 (e.g., a speaker) and a network interface device 2120.

The drive unit 2116 includes a machine-readable medium 2122 on which is stored one or more sets of instructions (e.g., software 2124) embodying any one or more of the methodologies or functions described herein. The software 2124 may also reside, completely or at least partially, within the main memory 2104 and/or within the processor 2102 during execution thereof by the computer system 2100, the main memory 2104 and the processor 2102 also constituting machine-readable media.

The software 2124 may further be transmitted or received over a network 2126 via the network interface device 2120.

While the machine-readable medium 2122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for information querying have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
    receiving, by a processing system comprising a processor, a query command during a media presentation, wherein the media presentation includes media images and an audio portion;
    determining a first text portion associated with the media images based on an analysis of the audio portion of the media presentation temporally associated with a receipt of the query command;
    providing a presentation image of the first text portion to be included in the media presentation;
    accessing, by the processing system, a media image of the media images associated with the media presentation in accordance with the receiving of the query command;
    accessing, by the processing system, a prior image of the media images of the media presentation responsive to the accessing the media image;
    receiving, by the processing system, a selection of a portion of the first text portion as a second text portion;
    performing, by the processing system, facial recognition on the prior image to receive facial recognition data;
    querying, by the processing system, an information source with the second text portion and the facial recognition data, the information source being capable of using the facial recognition data to provide a first result related to the selection of the second text portion;
    providing, by the processing system, the first result to be included in the media presentation;
    receiving, by the processing system, a selection of a third text from text included in the first result;
    querying, by the processing system, the information source based on the selection of the third text to provide a second result; and
    providing, by the processing system, the second result to be included in the media presentation.

2. The method of claim 1, further comprising identifying keywords from the second text portion.

3. The method of claim 1, further comprising providing feedback regarding the querying of the information source.

4. The method of claim 1, further comprising:
    receiving the first result from the information source in response to the query; and
    providing the first result for the presentation on a display presenting the media presentation.

5. The method of claim 1, wherein the media presentation further comprises embedded images, accessed images, or combinations thereof, and
    wherein the query command pauses the presentation.

6. The method of claim 1, wherein the first result comprises one of text data, image data, audio data, video data, or combinations thereof.

7. A method, comprising:
    accessing, by a processing system comprising a processor, a plurality of candidate terms associated with a media presentation based on an analysis of an audio portion of the media presentation, wherein the media presentation provides the plurality of candidate terms in a selectable image;
    receiving, by the processing system, a predictive text entry for the media presentation as a selection of one of the plurality of candidate terms;
    identifying, by the processing system, an identified term associated with the media presentation based on the plurality of candidate terms and the predictive text entry;
    querying, by the processing system, an information source with the identified term;
    accessing, by the processing system, a prior image of the media presentation based on a command;
    performing, by the processing system, facial recognition on the prior image to receive facial recognition data, wherein the querying of the information source is performed with the predictive text entry and the facial recognition data;
    providing a first result of the performing the facial recognition in the media presentation;
    receiving, by the processing system, a selection of a third text from text included in the first result;

querying, by the processing system, the information source based on the selection of the third text to provide a second result; and providing, by the processing system, the second result to be included in the media presentation.

8. The method of claim 7, further comprising providing feedback regarding the querying of the information source.

9. The method of claim 7, further comprising:

receiving the first result from the information source in response to the query.

10. The method of claim 7, wherein the accessing the prior image of the media presentation is based on a stop command.

11. The method of claim 7, further comprising selecting a presentation image from a plurality of images of the media presentation, wherein the selecting comprises one of pausing, fast-forwarding, slow-forwarding, or rewinding the media presentation from a prior image to the presentation image.

12. The method of claim 11, further comprising accessing a second text associated with the presentation image using speech recognition of a second audio portion associated with the presentation image of the media presentation.

13. The method of claim 12, further comprising:

receiving a selection of a portion of the second text to produce presented text; and providing the presentation image and the presented text to be included in the media presentation.

14. A non-transitory, machine-readable storage medium, comprising executable instructions that, when executed by a processing system including a processor, facilitate performance of operations, comprising:

receiving a query command responsive to selecting a media image from a media presentation;

accessing the media image associated with the media presentation in accordance with the receiving of the query command;

accessing recent text temporally associated with a receipt of the query command associated with the media presentation, wherein the recent text is determined based on an analysis of an audio portion of the media presentation;

providing a presentation image of the recent text to be included in the media presentation;

receiving a selection of a portion of the recent text to produce a presented text;

performing facial recognition on the media image to receive facial recognition data;

querying a first information source with a portion of the presented text and the facial recognition data, the information source being capable of using the portion to provide a first search result;

receiving the first search result from the first information source in response to the query;

providing the first search result and the presented text for presentation on a display;

receiving a selection of a third text from text included in the first search result;

querying one of the first information source or a second information source based on the selection of the third text to provide a second search result; and presenting the second search result at the display.

15. The non-transitory, machine-readable storage medium of claim 14, wherein the operations further comprise identifying keywords from the recent text as a portion of the recent text.

16. The non-transitory, machine-readable storage medium of claim 14, wherein the operations further comprise providing feedback regarding the querying of the information source.

17. The non-transitory, machine-readable storage medium of claim 14, wherein the media presentation comprises one of an audio signal, a video signal, embedded images, accessed images, or combinations thereof, and wherein the first search result comprises one of text data, image data, audio data, video data, or combinations thereof.

18. The non-transitory, machine-readable storage medium of claim 14, wherein the selecting comprises one of pausing, fast-forwarding, slow-forwarding, or rewinding the media presentation from a prior image to pause on the media image.

* * * * *